Patented Feb. 17, 1948

2,436,233

UNITED STATES PATENT OFFICE 2,436,233

PROCESS FOR PREPARING MONOMERIC DITHIOGLYCIDOL

Frank Kerr Signaigo, Wilmington, Del., assignor to E. I. du Pont de Nemours & Company, Wilmington, Del., a corporation of Delaware No Drawing. Application August 16, 1943,
Serial No. 498,879

2 Claims. (Cl. 260—327)

This invention relates to the dehydration of 1,2-dithioglycerol and to the product resulting therefrom, hereinafter called dithioglycidol.

Dithioglycidol, which may also be called mercaptomethylethylene sulfide, has the structural formula

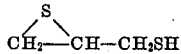

This monomeric compound has not heretofore been prepared. It is well adapted to serve as an intermediate in numerous chemical syntheses, because of the presence of a thiol group and of a reactive ethylene sulfide ring.

An object of this invention is the provision of a process for the preparation of monomeric dithioglycidol. Another object is to provide a process for preparing monomeric dithioglycidol by dehydration of 1,2-dithioglycerol. Other objects will appear hereinafter.

These objects are accomplished by the invention of monomeric dithioglycidol

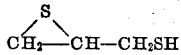

a colorless liquid boiling at 36° C. under a pressure of 5.5 mm. and at 77° C. under a pressure of 30 mm., and a process for preparing the same by dehydrating 1,2-dithioglycerol by heating the latter to its dehydration temperature and isolating the 1,2-dithioglycidol formed.

The reaction apparently proceeds according to the equation

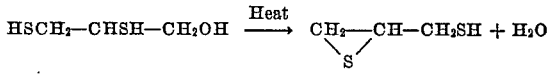

At the same time, there is probably formed a small amount of hydroxymethylethylene sulfide,

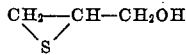

through removal of hydrogen sulfide from the 1,2-dithioglycerol. The reaction is also attended by formation of polymeric materials which have a consistency varying from that of a viscous oil to that of a rubbery solid. It is, however, possible to separate the monomeric dithioglycidol in pure form from these by-products.

The 1,2-dithioglycerol used as the starting material in the process of this invention has recently been described in Ber. 75, 13, (1942). It may be prepared conveniently from glycerol-1,2-dibromohydrin by the following procedure.

Two hundred and sixty parts of a 30% methanol solution of sodium methoxide is saturated with hydrogen sulfide at 80 pounds pressure at 25° C. in a steel autoclave. One hundred and forty-five parts of glycerol-1,2-dibromohydrin dissolved in 80 parts of methanol is then injected during 1.3 hours into the methyl alcoholic sodium hydrosulfide solution at 50° C. The mixture is heated further at 60° C. for 3 hours. The cooled contents of the autoclave are acidified with acetic acid, and 150 parts of water is added to dissolve the separated salt. The methanol is then removed by distillation at reduced pressure and the residue of oil and salt solution is taken up in water and ether. The layers are separated and the aqueous solution is extracted three times with additional ether. The combined ether extracts are dried over sodium sulfate and the ether is removed by vacuum distillation. The oil residue is then subjected to a primary distillation, whereby 1,2-dithioglycerol is obtained at 70-75° C. at 0.3-0.5 mm. pressure. If pressures higher than that indicated are used, some dehydration to dithioglycidol may take place during this primary distillation.

The more detailed practice of the invention is illustrated by the following example, wherein parts given are by weight. There are, of course, many forms of the invention other than these specific embodiments.

Example

A flask is fitted with a fractioning column and a reflux head provided with a system of stopcocks permitting either total reflux or partial reflux with passage of the distillate to the receiver. The apparatus is connected to a vacuum pump through a cold trap. In the flask is placed 600 parts of once distilled 1,2-dithioglycerol. The pressure is reduced to 10 mm. of mercury and the dithioglycerol is heated to reflux (111° C. at that pressure). After a few minutes at total reflux, the temperature of the refluxing liquid drops to about 50-60° C. At this point, the low boiling product is continuously withdrawn at such a rate that the temperature does not rise above 60° C. After several hours of refluxing, there is obtained 273 parts of distillate (exclusive of the water collected in the cold trap), the residue in the still being then a rubbery polymer. The distillate is refractioned, yielding 165 parts of pure dithioglycidol boiling at 54–56° C. at 10 mm. pressure.

Dithioglycidol is a colorless liquid which has the following physical characteristics: $D_4^{25}$: 1.1741; $n_D^{25}$: 1.5799; B. P. at 5.5 mm., 36° C.; B. P. 30 mm., 77° C.

Analyses: Found, C: 34.0%; H, 5.34%; S, 60.9%; 60.4%. Calculated for $C_3H_5S_2$: C, 34.0%; H, 5.65%; S, 60.4%.

By rapid titration of an alcoholic solution of dithioglycidol with standard iodine, an approximate value for mercapto sulfur of 32% is obtained (calculated 30.2%). This determination gives percentages of sulfur somewhat higher than actual since the compound reacts slowly with additional iodine, probably through opening of the ethylene sulfide ring.

In the operation of this process, it is desirable that the dithioglycidol be removed from the reaction zone as soon as possible, in order to avoid exposing it, as well as the unconverted 1,2-dithioglycerol, to high temperatures for an unduly long period. For this reason, it is preferable to operate under reduced pressure, since dehydrating the 1,2-dithioglycerol at atmospheric pressure leads to decreased yields of dithioglycidol and increased polymerization and other side reactions.

While the dehydration can be carried out at temperatures as low as 100° C. or even lower, the formation of dithioglycidol at these temperatures is slow and it is therefore preferred to operate above 100° C. The temperatures just mentioned refer, of course, to the liquid mixture and not to the escaping vapors of dithioglycidol and water, which are much cooler. The dehydration temperature depends somewhat on the degree of purity of the 1,2-dithioglycerol and it is not possible to state a preferred temperature range in absolute terms. However, it can be said that the reaction temperature should be kept as low as is consistent with a practical reaction rate, and that excessive heating should be avoided, in order to minimize the tendency for side reactions to occur. Determination of the proper dehydration temperature for a given sample of 1,2-dithioglycerol offers no difficulty for the skilled experimenter. Generally speaking, the reaction will be most favorably conducted at a pressure between 5 and 25 mm. of mercury and at a temperature varying between 100° C. and the refluxing temperature of the 1,2-dithioglycerol at the pressure selected.

The process can be carried out in a continuous manner, for example by running 1,2-dithioglycerol, preheated, if desired, into a reaction vessel maintained at the necessary temperature and continuously withdrawing the dithioglycidol, or by passing the 1,2-dithioglycerol through a hot tube filled with porous material and removing the vapors of dithioglycidol from the tube.

If desired, the reaction may be accelerated by using dehydration catalysts such as zinc chloride, ferric chloride, mineral acids, etc. Caustic alkalies may be used but they have a tendency to increase the formation of polymerization products. Gaseous hydrogen halides such as hydrochloric and hydrobromic acids are also useful.

Dithioglycidol polymerizes readily to useful polymers containing thioether and thiol groups. The monomeric compound is useful as an intermediate in a number of chemical syntheses.

The above description and example are intended to be illustrative only. Any modification of or variation therefrom which conforms to the spirit of the invention is intended to be included within the scope of the claims.

What is claimed is:

1. Process for preparing monomeric dithioglycidol which comprises heating 1,2-dithioglycerol at a pressure of 5–25 mm. to a temperature between 100° C. and the boiling point, at said pressure, of 1,2-dithioglycerol and continuously separating the monomeric dithioglycidol formed.

2. Process for preparing monomeric dithioglycidol which comprises heating 1,2-dithioglycerol under reduced pressure to a dehydration temperature between 100° C. and the refluxing temperature of the 1,2-dithioglycerol at the pressure employed, and continuously separating the monomeric dithioglycidol formed.

FRANK KERR SIGNAIGO.

REFERENCES CITED

The following references are of record in the file of this patent:

UNITED STATES PATENTS

| Number | Name | Date |
| --- | --- | --- |
| 1,018,329 | Lillienfeld | Feb. 20, 1912 |
| 2,183,860 | Coltof | Dec. 19, 1939 |

OTHER REFERENCES

Beilstein, 4th edition, vol. 17, page 107.